United States Patent
Zheng et al.

(10) Patent No.: US 10,515,116 B2
(45) Date of Patent: Dec. 24, 2019

(54) GENERATION OF VIDEO RECOMMENDATIONS USING CONNECTION NETWORKS

(71) Applicant: Hulu, LLC, Santa Monica, CA (US)

(72) Inventors: Yin Zheng, Beijing (CN); Bangsheng Tang, Beijing (CN); Wenkui Ding, Beijing (CN); Hanning Zhou, Beijing (CN)

(73) Assignee: HULU, LLC, Santa Monica, CA (US)

( * ) Notice: Subject to any disclaimer, the term of this patent is extended or adjusted under 35 U.S.C. 154(b) by 350 days.

(21) Appl. No.: 15/427,873

(22) Filed: Feb. 8, 2017

(65) Prior Publication Data

US 2017/0228385 A1   Aug. 10, 2017

Related U.S. Application Data

(60) Provisional application No. 62/292,680, filed on Feb. 8, 2016.

(51) Int. Cl.
*G06F 16/78* (2019.01)
*H04N 21/25* (2011.01)
(Continued)

(52) U.S. Cl.
CPC ........ *G06F 16/7867* (2019.01); *G06F 16/738* (2019.01); *G06N 3/0454* (2013.01);
(Continued)

(58) Field of Classification Search
CPC ...... G06N 20/00; G06N 7/005; H04N 21/251; H04N 21/4826
See application file for complete search history.

(56) References Cited

U.S. PATENT DOCUMENTS

| 6,249,785 B1* | 6/2001 | Paepke ................ G06Q 30/02 |
| 2012/0096086 A1* | 4/2012 | Wei .................... G06Q 30/0201 |
| | | 709/204 |

(Continued)

OTHER PUBLICATIONS

Wikipedia, Backpropagation, retrieved at https://en.wikipedia.org/w/index.php?title=Backpropagation&oldid=703413585 (Year: 2016).*

(Continued)

*Primary Examiner* — William Spieler
(74) *Attorney, Agent, or Firm* — Fountainhead Law Group P.C.

(57) ABSTRACT

A method receives ratings for videos from a first user that is using a video delivery service. A first model includes connection networks where each connection network corresponds to a rating. The method inputs each rating into a connection network in an order. Also, parameters for the ratings and ratings other than the rating received from the first user are modeled in a respective connection network. Values for the set of parameters are trained such that the plurality of connection networks predict conditional probabilities that the first user would provide the rating corresponding to the each connection network in the order. The conditional probabilities are based on the first user providing ratings that are previously located in the order. The parameters are then used to generate a list of videos to recommend to the first user using the first model.

21 Claims, 12 Drawing Sheets

(51) Int. Cl.
| | |
|---|---|
| H04N 21/466 | (2011.01) |
| H04N 21/482 | (2011.01) |
| H04N 21/475 | (2011.01) |
| G06N 7/00 | (2006.01) |
| G06N 20/00 | (2019.01) |
| G06F 16/738 | (2019.01) |
| H04N 21/258 | (2011.01) |
| H04N 21/643 | (2011.01) |
| G06N 3/04 | (2006.01) |
| G06N 3/08 | (2006.01) |

(52) U.S. Cl.
CPC .............. *G06N 3/08* (2013.01); *G06N 7/005* (2013.01); *G06N 20/00* (2019.01); *H04N 21/251* (2013.01); *H04N 21/25891* (2013.01); *H04N 21/4668* (2013.01); *H04N 21/4756* (2013.01); *H04N 21/4826* (2013.01); *H04N 21/64322* (2013.01)

(56) References Cited

U.S. PATENT DOCUMENTS

2012/0096488 A1* 4/2012 Wei .................. H04N 21/44016 725/34
2016/0350834 A1* 12/2016 Wilson ............... G06Q 30/0631

OTHER PUBLICATIONS

Rumelhart, David E., Geoffrey E. Hinton, and Ronald J. Williams. "Learning representations by back-propagating errors." Cognitive modeling 5.3 (1988): 1. (Year: 1988).*
Bastien et al.: "Theano: new features and speed improvements", Deep Learning and Unsupervised Feature Learning NIPS 2012 Workshop, 2012, 10 pages.
Bennett et al.: "The Netflix Prize", Proceedings of KDD cup and workshop, vol. 2007, Aug. 12, 2007, 4 pages.
Billsus et al.: "Learning Collaborative Information Filters", AAAI Technical Report WS-98-08, 1998, 5 pages.
Dziugaite et al.: "Neural Network Matrix Factorization", arXiv:1511.06443, Dec. 15, 2015, 7 pages.
Gopalan et al.: "Bayesian Nonparametric Poisson Factorization for Recommendation Systems", Proceedings of the 17th Int'l Conference on Artificial Intelligence and Statistics, 2014, 9 pages.
Gopalan et al.: "Content-based recommendations with Poisson factorization", NIPS'14 Proceedings of the 27th International Conference on Neural Information Processing Systems, Dec. 8-13, 2014, 11 pages.
Gopolan et al.: "Scalable Recommendation with Poisson Factorization", arXiv 1311.1704, May 20, 2014, 10 pages.
Harper et al.: "The MovieLens Datasets: History and Context", ACM Transactions on Interactive Intelligent Systems, 2015, 22 pages.
He et al.: "Deep Residual Learning for Image Recognition", arXiv:1512.03385, Dec. 10, 2015, 12 pages.
Hu et al.: "Collaborative Filtering for Implicit Feedback Datasets", In Data Mining, 2008, ICDM'08, Eighth IEEE International Conference, 10 pages.
Kingma: "Adam: A Method for Stochastic Optimization", arXiv:1412.6980, 2014, 15 pages.
Koren et al.: "Matrix Factorization Techniques for Recommender Systems", Computer, IEEE computer Society, 2009 IEEE, 8 pages.
Krizhevsky et al.: "ImageNet Classification with Deep Convolutional Neural Networks", In Advances in neural information processing systems, 2012, 8 pages.
Larochelle et al.: "A Neural Autoregressive Topic Model", In Advances in Neural Information Processing Systems, 2012, 9 pages.
Larochelle et al.: "The Neural Autoregressive Distribution Estimator", Proceedings of the 14th International Conference on Artificial Intelligence and Statistics, 2011, pp. 29-37.
Lawrence et al.: "Non-linear Matrix Factorization with Gaussian Processes", Proceedings of the 26th International Conference on Machine Learning, 2009, 8 pages.
Lee et al.: "Local Low-Rank Matrix Approximation", Proceedings of the 30th International Conference on Machine Learning, 2013, 9 pages.
Mackey et al.: "Divide-and-Conquer Matrix Factorization", Advances in Neural Information Processing Systems, 2011, 9 pages.
Mnih et al.: "Probabilistic Matrix Factorization", Advances in Neural Information Processing Systems, 2007, 8 pages.
Rennie et al.: "Fast Maximum Margin Matrix Factorization for Collaborative Prediction", Proceedings of the 22nd International Conference on Machine Learning, 2005, 7 pages.
Resnick et al.: "GroupLens: An Open Architecture for Collaborative Filtering of Netnews", Proceedings of ACM 1994 Conference on Computer Supported Cooperative Work, 1994, 18 pages.
Salakhutdinov et al.: "Bayesian Probabilistic Matrix Factorization using Markov Chain Monte Carlo", Proceedings of the 25th International Conference on Machine Learning, 2008, 8 pages.
Salakhutdinov et al.: "Restricted Boltzmann Machines for Collaborative Filtering", Proceedings of the 24th International Conference on Machine Learning, 2007, 8 pages.
Sedhain et al.: "AutoRec: Autoencoders Meet Collaborative Filtering", Proceedings of the 24th International Conference on World Wide Web Companion, May 18-22, 2015, 2 pages.
Shi et al.: "List-wise Learning to Rank with Matrix Factorization for Collaborative Filtering", Proceedings of the fourth ACM Conference on Recommender systems, Sep. 26-30, 2010, pp. 269-272.
Srivastava et al.: "Dropout: A Simple Way to Prevent Neural Networks from Overfitting", The Journal of Machine Learning Research 15 (2014), pp. 1929-1958.
Szegedy et al.: "Going Deeper with Convolutions", Computer Vision Foundation, CVPR2015, 9 pages.
Truyen et al.: "Ordinal Boltzmann Machines for Collaborative Filtering", Proceedings of the Twenty-fifth Conference on Uncertainty in Artificial Intelligence, AUAI Press 2009, 9 pages.
Uria et al.: "A Deep and Tractable Density Estimator", Proceedings of the 31st International Conference on Machine Learning, 2014, 9 pages.
Uria et al.: "RNADE: The real-valued neural autoregressive density-estimator", Advances in Neural Information Processing Systems, 2013, 12 pages.
Van Merrienboer et al.: "Blocks and fuel: Frameworks for deep learning", arXiv:1506.00619, 2015, 5 pages.
Xia et al.: "Listwise Approach to Learning to Rank-Theory and Algorithm", Proceedings of the 25th International Conference on Machine Learning, 2008, 8 pages.
Zheng et al.: "A Deep and Autoregressive Approach for Topic Modeling of Multimodal Data", Patern Analysis and Machine Intelligence, IEEE Transactions on, 2015, 24 pages.
Zheng et al.: "A Neural Autoregressive Approach to Attention-based Recognition", International Journal of Computer Vision, 2014, 17 pages.
Zheng et al.: "Topic Modeling of Multimodal Data: an Autoregressive Approach", Computer Vision and Pattern Recognition, CVPR2014, 8 pages.

* cited by examiner

GENERATION OF VIDEO RECOMMENDATIONS USING CONNECTION NETWORKS

CROSS REFERENCE TO RELATED APPLICATIONS

The present disclosure claims priority to U.S. Provisional App. No. 62/292,680, entitled "Neural Autoregressive Architecture for Collaborative Filtering (CF) Tasks", filed Feb. 8, 2016, the contents of which is incorporated herein by reference in its entirety.

BACKGROUND

In a video delivery service, the quality of the recommendations provided to a user is important. For example, the video delivery service may want to recommend a collection of videos to a user, such as different episodes of a show or movies to the user. Generating recommendations that are relevant to the user may require a large amount of computing resources and time. When operating in a real-time online environment, such as when a user is using an application offered by the video delivery service to select videos to watch, recommendations need to be calculated in a very short amount of time. That is, while a user is browsing a site for the video delivery service, the recommendations may need to be generated as the user logs on to the service, selects an item on a page, or browses to another page. The recommendations need to be computed in the time required to display the page, but also be relevant to the user.

DETAILED DESCRIPTION

Described herein are techniques for a recommendation generation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments generate recommendations that predict a user's preference for a video based on the user's previous preferences and the preferences of other users. In one embodiment, a user-specific model is generated for each user of a video delivery service. The model may include multiple neural networks that are used to predict a user's preferences for videos based on a user's ratings of videos. Even though user-specific models are created, the models for multiple users share parameters, such as the parameters used for the neural networks. A model may be trained to determine parameters for the model. Then, a user-specific model may be generated based on a user's ratings using the parameters and the user-specific model is used to predict a user's preference for videos the user has not yet rated. The user's preference for videos is then used to output recommendations to the user.

Overview

Figure 1:
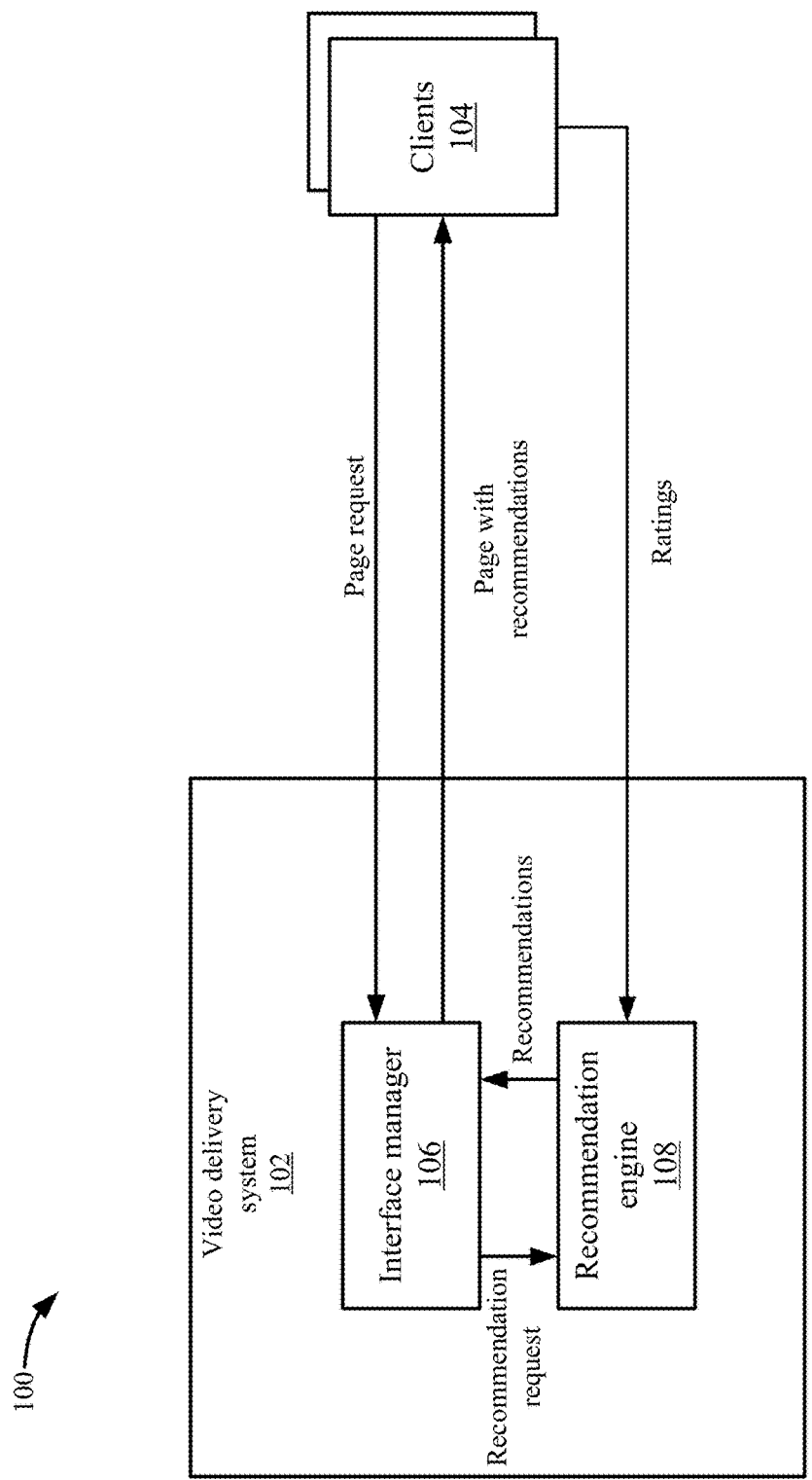
FIG. 1 depicts a simplified system for providing recommendations according to one embodiment.

FIG. 1 depicts a simplified system 100 for providing recommendations according to one embodiment. System 100 includes a video delivery system 102 and clients 104. In one embodiment, users may use clients 104 to access the video delivery service via an application. Clients 104 may browse the application to display different pages of the application. Video delivery system 102 may provide recommendations that are displayed on pages in real-time as the user displays different pages of the application. In one embodiment, a user may log onto the video delivery service and a first page of the application is displayed. In the time taken to generate the first page, video delivery system 102 dynamically generates recommendations for the page. Also, the user may browse to different pages in the application or sections of the page. Video delivery system 102 may once again dynamically generate recommendations in real-time for the pages. In one embodiment, a page may be when new content is displayed by the application. Because the application is operating in a real-time online environment, video delivery system 102 needs to generate the recommendations extremely fast or undesirable delay in delivering the new page to the user may occur. Accordingly, particular embodiments use a recommendation engine 108 that improves the speed of the computing device by using neural networks to generate the recommendations while also achieving better accuracy in predicting a user's preference.

An interface manager 106 may receive requests from clients 104 for pages of the application. When interface manager 106 receives a request, interface manager 106 can contact a recommendation engine 108 to generate recommendations. For example, when a page that is requested includes a section for recommendations, then interface manager 106 contacts recommendation engine 108 upon receiving the request to generate the recommendations for display in the page. Although recommendations for videos are discussed, recommendations for items other than videos may be provided, such as music, advertisements, actors/actresses, or other entities. For example, items may be any entity in which as action can be performed by the user on the video delivery service, such as follow actions (e.g., follow an actor/actress), watch actions (e.g., watch a video), and other actions (e.g., add a video to your favorite list). The recommendations may recommend videos themselves or an action for the video, such as watch video #1.

Recommendation engine 108 uses a model to generate the recommendations. The model includes multiple neural networks that are trained in a specific way that considers aspects of how the video delivery service operates. For example, the video delivery service may allow users to rate videos using a ratings system that is based on a limited number of ratings, such as a rating scale of 1-5 (e.g., a five-star scale). That is, the user may rate a video with a rating between a range of 1-5 with any increment in between the range possible (e.g., one star increments or half-star increments). The training of the neural networks learns values for the parameters for the rating values for the neural networks. Also, the training of the neural networks share parameters between ratings in the rating scale as will be described in more detail below. Further, the ordinal nature of the ratings is enforced in the training. That is, if the true rating of an item by a user is a rating of 3 out of 5, that predicting that a rating of 4 is preferred to predicting a rating of 5 for that user. The ordinal nature in this case means that the rating of 4, which is closer to the rating of 3 than the rating of 5, is more preferred rather than predicting that the user's preference would be a rating of 5.

Using the connection networks, such as neural networks, allows recommendation engine 108 to provide more accurate recommendations for the video delivery service in response to receiving a request for recommendations. Also, in the real-time nature of the video delivery service, the recommendations need to be generated quickly when the user is browsing the interface provided by the video delivery service. Thus, using the neural networks, recommendation engine 108 can generate accurate recommendations quickly.

Recommendation Engine

Figure 2:
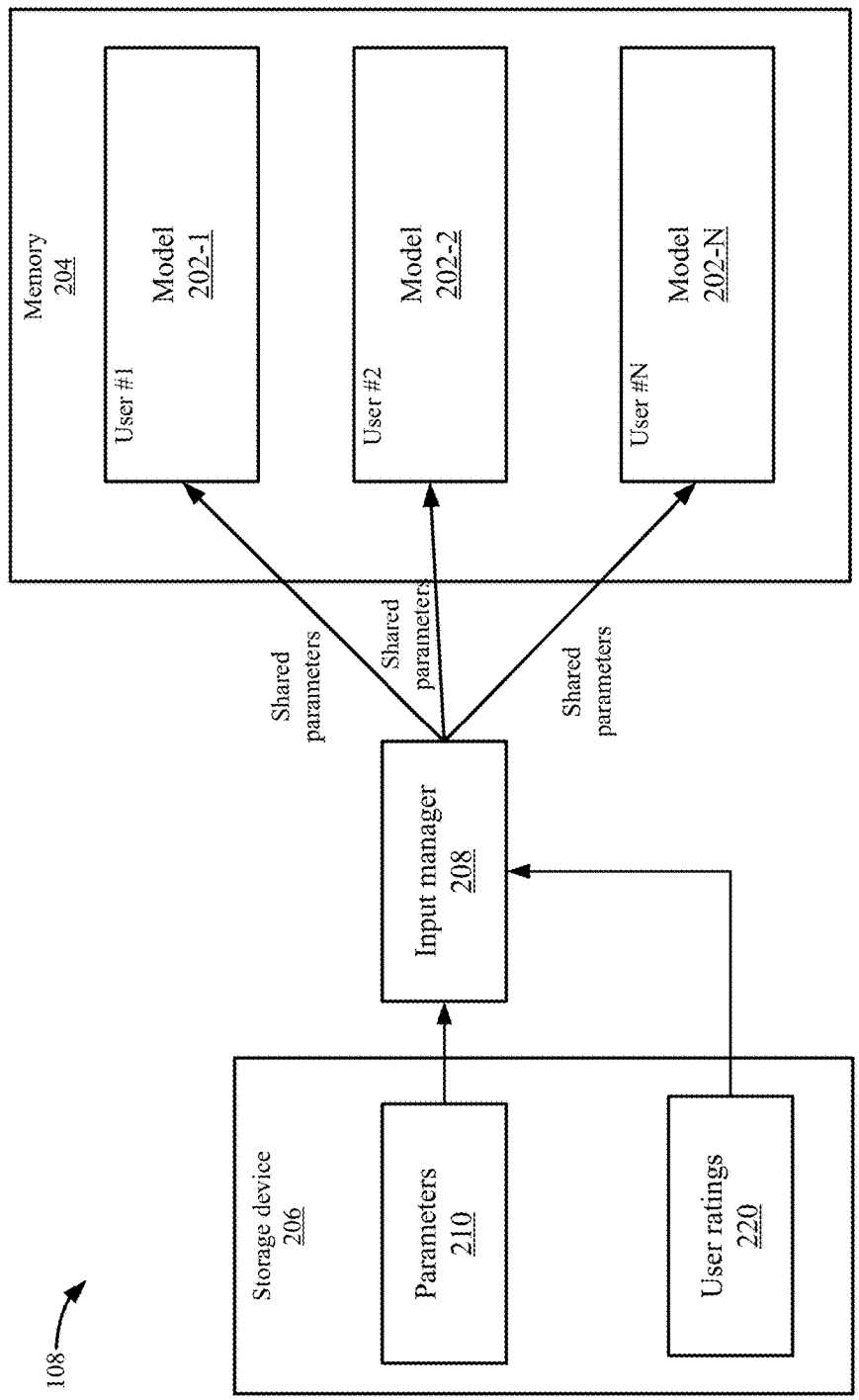
FIG. 2 depicts an example of a recommendation engine according to one embodiment.

FIG. 2 depicts an example of recommendation engine 108 according to one embodiment. The video delivery service may generate a user-specific model 202 for each user of the video delivery service. Each model may use user-specific information, such as the ratings for videos provided by a respective user. Accordingly, video delivery system 102 stores a model 202 for each user in memory 204. Memory 204 may be any type of storage, such as random access memory or read-only memory, that stores the configuration of models 202. In one example, if the video delivery service includes user #1, user #2, . . . , user #N, where N is a number, then recommendation engine 108 stores model #1 202-1, model #2 202-2, . . . , model #N 202-N, respectively, for user #1, user #2, . . . , user #N. When a new user is encountered and generates a ratings history, recommendation engine 108 can use the user's rating history to instantiate a user-specific model for that user to make predictions.

Recommendation engine 108 may first train a model to learn the parameters of the model, which can be stored for later use in determining recommendations. For example, recommendation engine 108 may use user behavior for specific users to train a user-specific model for each respective user. The user behavior information may include the ratings for videos that a user has provided while using the video delivery service. Once a model is trained, the parameters that are learned from the training can be used to instantiate user-specific models for existing or new users. Thus, models may be instantiated during training or after training for users. The instantiation of a model may generate a model for the user. The training may be performed using information from a subset of users using the video delivery service.

Figure 3:
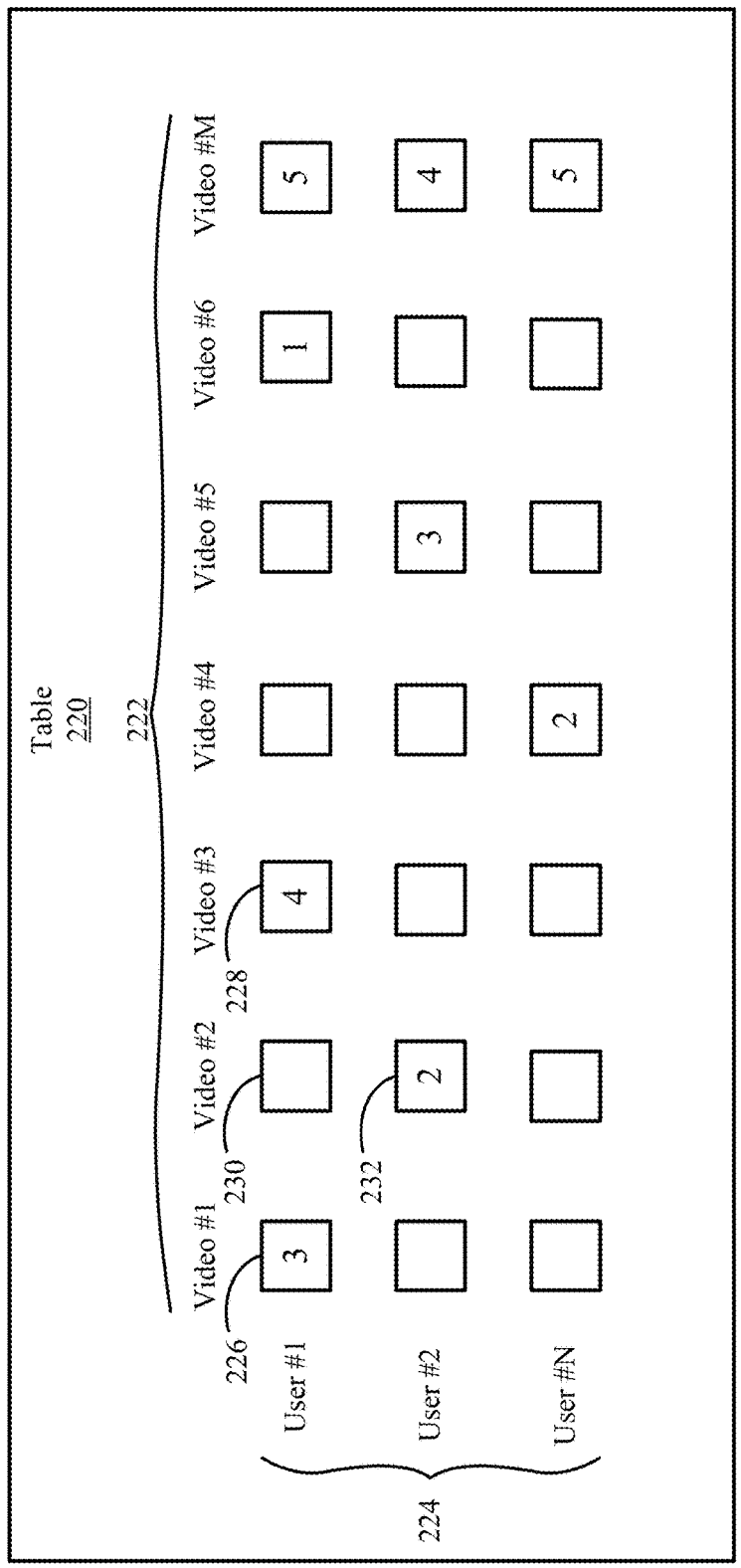
FIG. 3 shows an example of the storing of ratings for a user in a table according to one embodiment.

An input manager 208 stores ratings that are received from a user in a table 220 in a storage device 206. Given that different users may view different videos, decide to rate different videos, and also provide different ratings to videos, the ratings received are different for each user. FIG. 3 shows an example of the storing of ratings for a user in table 220 according to one embodiment. Although a structure of table 220 is described, it will be understood that data may be organized in different ways, such as changing the organization of columns and rows.

In table 220, columns 222 correspond to videos #1-#M that are offered by the video delivery service. These are videos in which a user can view on the video delivery service. Rows 224 correspond to users #1-#N that are using the video delivery service. When the video delivery service receives ratings from a user, input manager 208 determines the appropriate entries in table 220 to update and stores the ratings in the entries.

Only some entries in table 220 may include ratings from a user. For example, entries shown with a number where the number corresponds to the rating received from a respective user are where a user has rated a video. Entries without a number mean that the user has not yet rated the corresponding video. For example, at 226, User #1 has rated video #1 with a rating of "3", and at 228, User #1 has rated video #3 with a rating of "4". At 230, User #1 has not rated video #2. However, at 232, User #2 has rated video #2 with a rating of "2". Some other entries of table 220 include ratings when respective users' have provided the ratings for a video.

Referring back to FIG. 2, storage 210 of storage device 206 stores the parameters of the model. If a user gave several ratings of videos, recommendation engine 208 trains the parameters such that the probability that the user gave such ratings of videos are maximized, which indicate that the parameters can model the user's preference. The model takes the ratings of candidate videos from a user as input, and then predicts the preference on the candidate videos of the user based on the parameters. These parameters are trained so that the model is optimized to predict the user's preference on the candidate videos. Each video includes a different parameter for each rating. For example, each video may include five parameters for five possible ratings in a rating scale from 1-5. The different parameters model the video differently for each rating.

To train models 202, input manager 208 retrieves the ratings for videos that were received for a user from table 220. Then, input manager 208 retrieves the parameter for each rating for the videos from storage 210. Also, input manager 208 may retrieve the parameters for other ratings associated with the videos that were rated by the user, as well as other parameters that are necessary to model the preference of the user. In the video delivery service, some ratings can appear much often than others for a video. This may mean the parameters of the rarely appeared ratings will be less optimized for the neural networks. To alleviate this problem, particular embodiments share parameters between different ratings. For example, if user #1 rated video #1 with a rating of 3, then input manger 208 retrieves the parameters for other ratings, such as the ratings including the current rating and ratings below the current rating (e.g., the ratings of 1, 2, and 3). Other ratings may also be retrieved, such as the ratings including the current rating and the ratings above the current rating (e.g., the ratings of 3, 4, and 5). Or a random number of other ratings may be used. The training trains the neural network to optimize the parameters corresponding to the rating for the video to indicate the user's preference. The training also optimizes the parameters for the other ratings not selected by the user to indicate the user's preference in not selecting the ratings. By using more ratings in the training, the ratings that may appear less also can be optimized.

Input manager 208 learns the applicable parameters for ratings in the respective models for users to train the models. The training of the models will be described in more detail below. After training, the user-specific models may be used to generate a list of recommendations for the users. For example, for each user, the previous ratings by the user may be input into the model and the model outputs a prediction of the user's preference for an unrated video. That is, given the user's past behavior, such as the ratings the user has provided for videos, a user's rating of a new video is predicted by the model. The videos with the highest predicted ratings may be output by the model and recommended to a user.

Model

Figure 4:
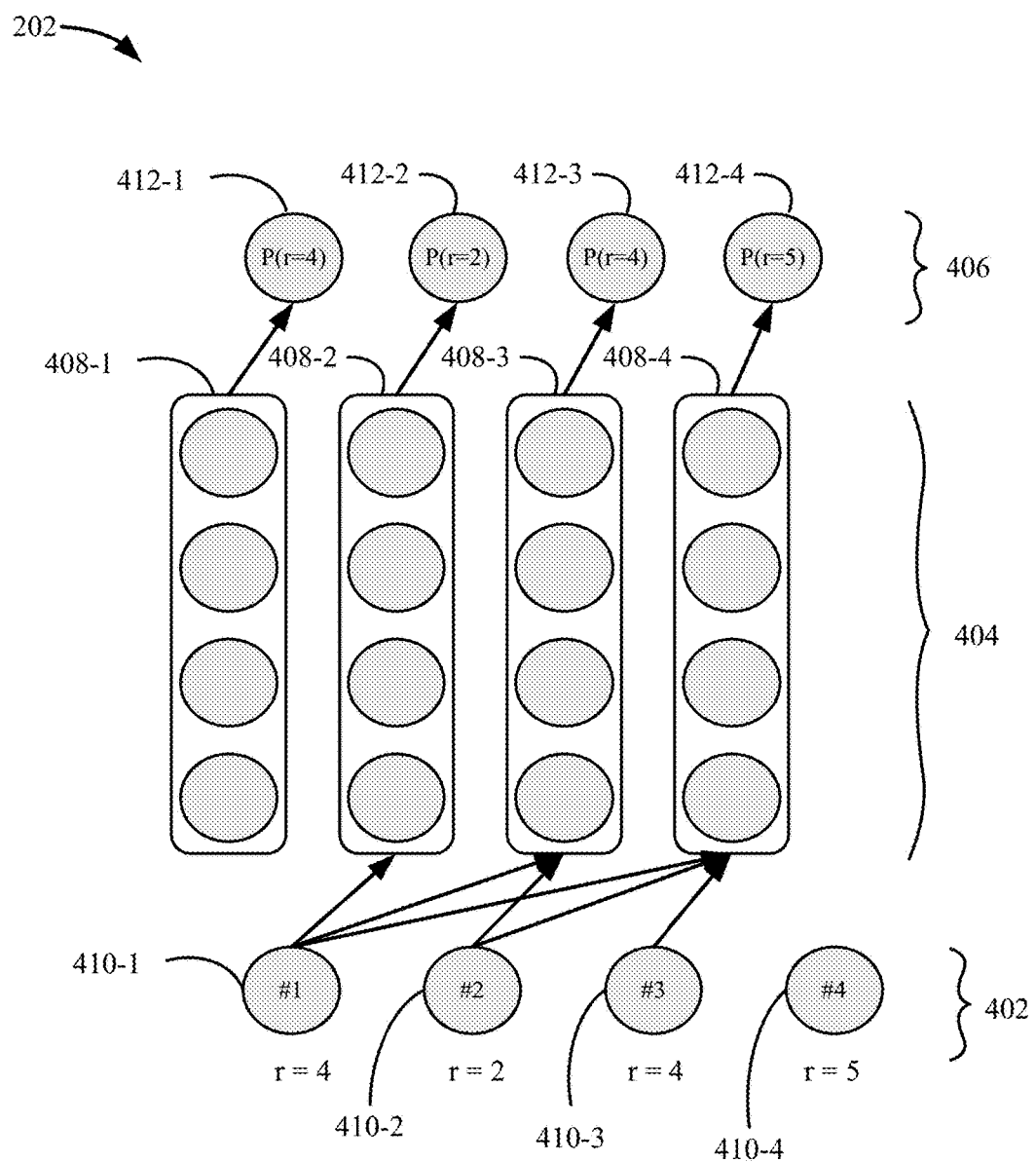
FIG. 4 depicts an example of a model according to one embodiment.

FIG. 4 depicts an example of a model 202 according to one embodiment. Model 202 may implement multiple neural networks 408, which may be a connection network. Each neural network includes an input layer 402, a hidden layer 404, and an output layer 406 that are connected together. Each layer is shown with nodes shown as circles; however, it will be recognized that each layer may have a different number of nodes. Each individual node may have a summation function that combines the values of all its inputs together. For example, the inputs of the input layer 402 are received and combined at nodes in hidden layer 404. The nodes in hidden layer 404 then output values to output layer 406, which combines the values together to generate an output.

In one example, the video delivery service may have N videos and N users, and the ratings may be from a 1 to K range (in increments, such as integers or half-integer increments). A different model is used for each user and all models have the same number of nodes in hidden layer 404. However, although the models may be user-specific, each model may share the same parameters. By sharing the same parameters, the problem of sparsity in ratings where some ratings may be more often provided by users than others may be resolved by training the less seen ratings with the ratings that are more prevalent. Even though the models all include the same number of hidden units, a user-specific model may have only D visible units if the user has only rated D items. The D visible units may be the number of neural networks 408-1-408-4 provided in the model that correspond to the D videos that were rated by the user. Accordingly, each model has a single training case, which is a vector of ratings that the user submitted for the user's items (e.g., viewed videos), but all the parameters of the models are tied together.

Hidden layer 404 includes a neural network 408 for each rating received by a user. For example, a user may have rated four videos, video #1, video #2, video #3, and video #4. Four neural networks 408-1-408-4 are thus included in model 202 for the four ratings. As will be discussed in more detail below, a different number of neural networks may exist for another user if the other user has rated a different number of videos.

Each neural network 408 may model the conditional probability of the user providing a rating. For example, a user may provide the ratings of [4, 2, 3, 5] for videos #1, #2, #3, and #4, respectively. Thus, the input vector for model 202 is [4, 2, 3, 5] at 410-1-410-4. Recommendation engine 108 uses the input vector to retrieve the parameters of the ratings for the videos and model 202 then models the conditionals using the parameters with the neural networks as:

1. The probability that the user gives video #1 a rating of 4 conditioned on nothing;
2. The probability that the user gives video #2 a rating of 2 conditioned on giving video #1 a rating of 4;
3. The probability that the user gives video #3 a rating of 3 conditioned on giving video #1 a rating of 4 and video #2 a rating of 2; and
4. The probability that the user gives video #4 a rating of 5 conditioned on giving video #1 a rating of 4, video #2 a rating of 2, and video #3 a rating of 3.

The four conditionals above are modeled by four neural networks 408-1-408-4, respectively. As discussed above, neural networks 408 may share parameters. For neural network 408-1, the parameter for video #1 is used to train the neural network. Also, the parameters for the ratings of 1, 2, 3, and 4 for video #1 may be used to train neural network 408-1. For neural network 408-2, the parameters for video #1 and video #2 are used to train the neural network. The parameters for the ratings of 1, 2, 3, and 4 for video #1 and the parameters for the ratings of 1 and 2 for video #2 are used to train neural network 408-2. For neural network 408-3, the parameters for video #1, video #2, and video #3 are used to train the neural network. The parameters for the ratings of 1, 2, 3, and 4 for video #1, the parameters for the ratings of 1 and 2 for video #2, and the parameters for the ratings of 1, 2, and 3 for video #3 are used to train neural network 408-3. For neural network 408-4, the parameters for video #1, video #2, video #3, and video #4 are used to train the neural network. The parameters for the ratings of 1, 2, 3, and 4 for video #1, the parameters for the ratings of 1 and 2 for video #2, the parameters for the ratings of 1, 2, and 3 for video #3, and the parameters for the ratings of 1, 2, 3, 4, and 5 for video #4 are used to train neural network 408-4. It is possible to perform the modeling without sharing parameters where each input only uses the respective parameter for the rating provided by the user and not parameters for any other rating.

Each neural network is trained to generate an output in output layer 406 that is the probability for the respective conditional. For example, at 412-1, the probability that the user gives video #1 a rating of 4 conditioned on nothing is output. This is conditioned on nothing because this is the first rating a user has provided. Then, at 412-2, the probability that the user gives video #2 a rating of 2 conditioned on giving video #1 a rating of 4 is output. Similarly, at 412-3, the probability that the user gives video #3 a rating of 3 conditioned on giving video #1 a rating of 4 and video #2 a rating of 2 is output. At 412-4, the probability that the user gives video #4 a rating of 5 conditioned on giving video #1 a rating of 4, video #2 a rating of 2, and video #3 a rating of 3 is output.

To generate the probabilities, recommendation engine 108 may minimize the negative log-likelihood of the probability. For example, the probability of the rating vector r by chain rule is:

$$p(r) = \prod_{i=1}^{D} p(r_{m_{o_i}} \mid r_{m_{o_{<i}}}),$$

where r is a rating a user gave to a video $m_{oi}$, $r_{mo_{<i}}$ denotes the first i−1 elements of r indexed by o, o is a D-tuple in the set of permutations of (1, 2, . . . , D), and D is the number of ratings.

The conditional in the above equation may be modeled as:

$$p(r_{m_{o_i}} = k \mid r_{m_{o<i}}) = \frac{\exp(s_{m_{o_i}}^k(r_{m_{o<i}}))}{\sum_{k'=1}^{K} \exp(s_{m_{o_i}}^{k'}(r_{m_{o<i}}))},$$

where s is the score indicating the preference that the user gave rating k for item $m_{oi}$ given the previous ratings $r_{mo<i}$, and the score s is computed as:

$$s_{m_{o_i}}^k(r_{m_{o<i}}) = \sum_{j \leq k}(b_{m_{o_i}}^j + V_{m_{o_i},:}^j \cdot h(r_{m_{o<i}})),$$

where $V^k$ and $b^k$ are the connection matrix and the bias term, respectively, associated with rating k. $V^k$ and $b^k$ are the parameters of the model. For example, the connection matrix and bias term are the parameters for the rating that is to be predicted. In the above equation, the hidden representation is computed as:

$$h(r_{m_{o<i}}) = g\left(c + \sum_{j<i}\sum_{k=1}^{r_{m_{o_j}}} W_{:,m_{o_j}}^k\right),$$

where g( ) is the activation function, such as a tanh(x) function, c is a bias term, $W^k$ is the connection matrix associated with rating k, which is a parameter that was trained during the training process.

The training optimizes the minimum negative log-likelihood of p(r) averaged over all the training cases as follows:

$$-\log p(r) = -\sum_{i=1}^{D} \log p(r_{m_{o_i}} \mid r_{m_{o<i}}).$$

Figure 5:
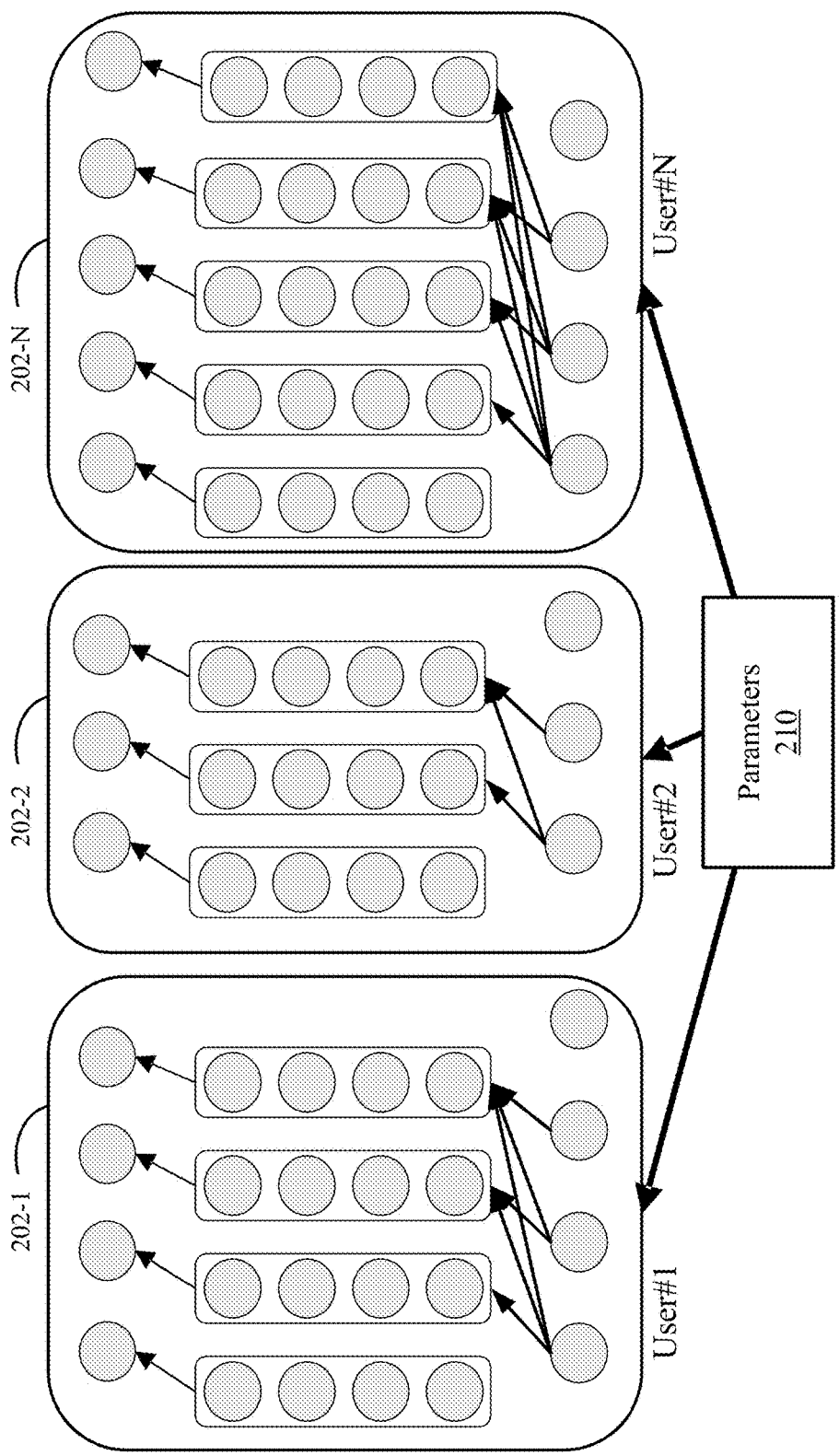
FIG. 5 depicts an example of different models for different users according to one embodiment.

Each user may have a different model depending on which videos the user has rated. FIG. 5 depicts an example of different models 202 for different users according to one embodiment. A model 202-1 for user #1, a model 202-2 for user #2, and a model 202-N for user #N are shown. Any number of models for users of the video delivery service may be instantiated.

Model 202-1 may be similar to the model described in FIG. 4. This model included four ratings for user #1. Model 202-1 may be different from the other models due to the number of ratings received, the value of the ratings received, and also the order of which videos the ratings were received in. For example, in model 202-2, user #2 provided three ratings for three videos and three neural networks are used in model 202-2. Also, in model 202-3, user #N provided five ratings for five videos and five neural networks are used in model 202-3. The different users may provide ratings for some of the same videos or different videos.

Parameters in storage 210 for the videos are shared among models 202. However, not all models 202 will use the same exact parameters unless the users rated the same videos with the same ratings (in the same order). However, models use the same parameters for those videos that are rated by multiple users.

Figure 6:
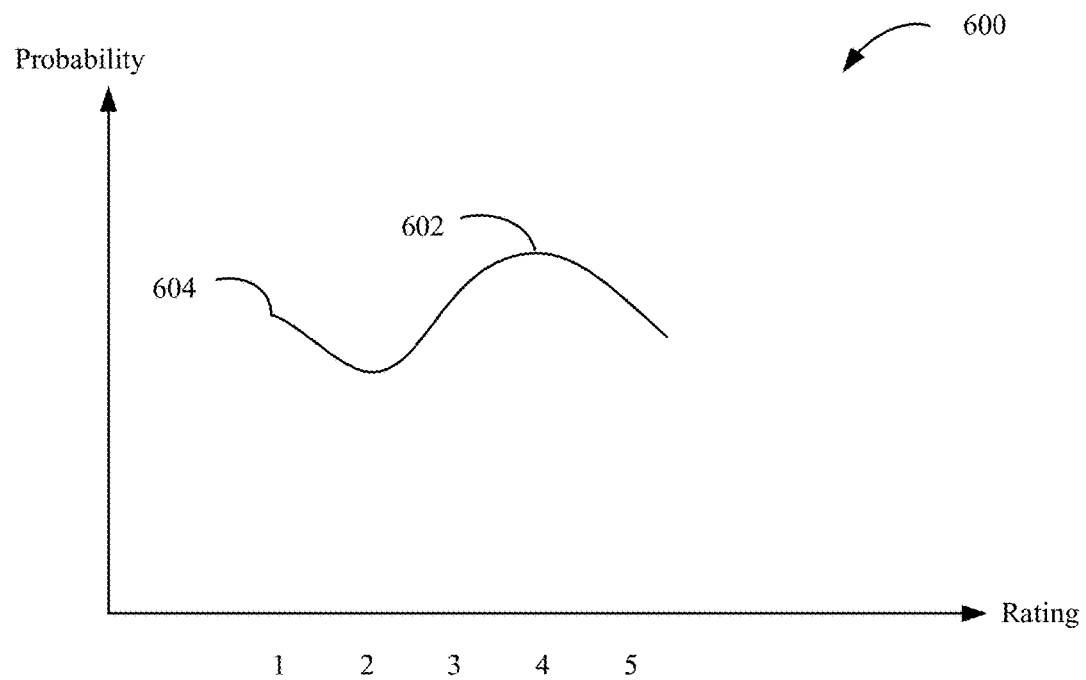
FIG. 6 shows an example of an ordinal cost contrasted with regular cost according to one embodiment.
Figure 6:
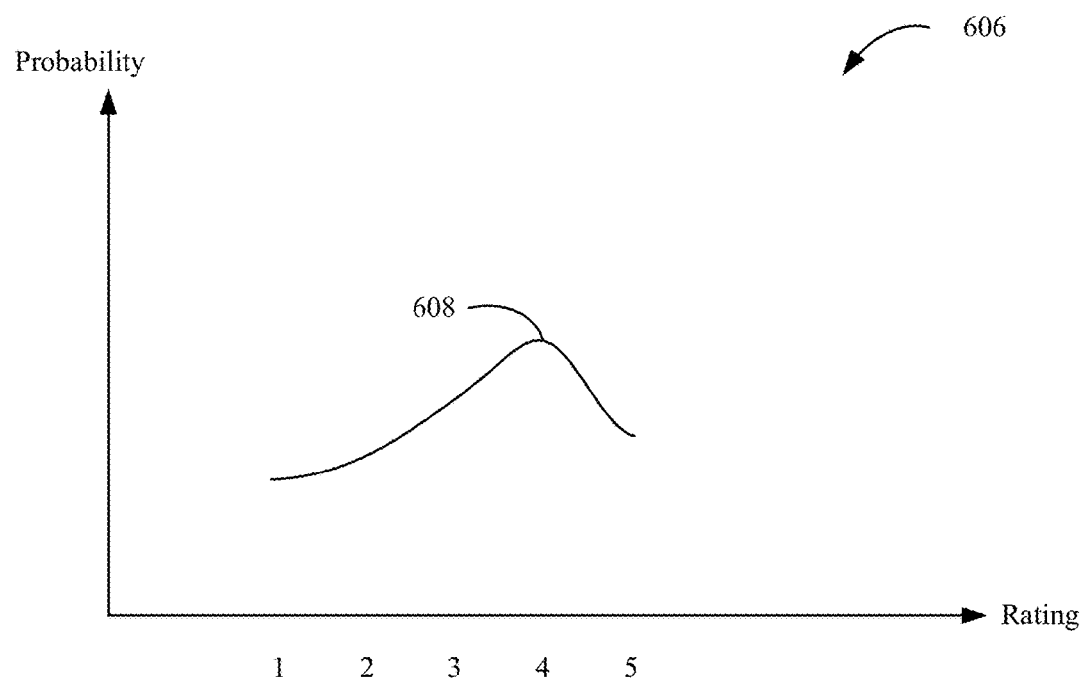

In the training of models 202, the ordinal nature of the rankings for the video delivery service may be enforced. For example, given that a user is rating a video, it is likely that the ratings scale follows an ordinal cost model. That is, if a user gives a rating of 4, then the probability that the user would give a higher ranking to a rating that is farther away from the rating of 4 should not be higher than a ranking closer to the rating of 4. For example, if the rating scale is from 1-N, if a user rated an item with the rating of X, the preference of the user to the ratings from 1 to X should increase monotonically and the preference to the ratings from X to N should decrease monotonically. In one example, the probability the user gives a rating of 1 should not be higher than the probability the user gives a rating of 3 if the user gave an actual rating of 4. FIG. 6 shows an example of an ordinal cost contrasted with regular cost according to one embodiment. A first graph 600 shows a regular cost. The Y axis shows the probability and the X axis shows the ratings. At 602, the probability is highest at the rating of 4. However, at 604, the probability that the user would give a rating of 1 is higher than the probability the user would give a rating of 2. This regular cost may not reflect a user's preferences for the video delivery service.

A second graph 606 shows an ordinal cost. At 608, the probability is highest at the rating of 4 again. However, from 610 to 608, the probability increases from the ratings of 1, 2, and 3 to 4. Then, the probability decreases from the rating of 4 to the rating of 5. In this case, there is only one peak in the cost, which better reflects a user's preferences for the video delivery service. For the conditional probability, using the ordinal cost may modify the conditional to be:

$$p(r_{m_{o_i}} = k \mid r_{m_{o<i}}) = \prod_{j=k}^{1} \frac{\exp(s_{m_{o_i}}^j)}{\sum_{t=1}^{j} \exp(s_{m_{o_i}}^t)} \prod_{j=k}^{K} \frac{\exp(s_{m_{o_i}}^j)}{\sum_{t=j}^{K} \exp(s_{m_{o_i}}^t)}.$$

In the above equation, the score s is modified to represent the ordinal cost. This conditional probability measures the probability of the desired orderings, while the prior conditional probability measures the probability of the correct rating.

Figure 7:
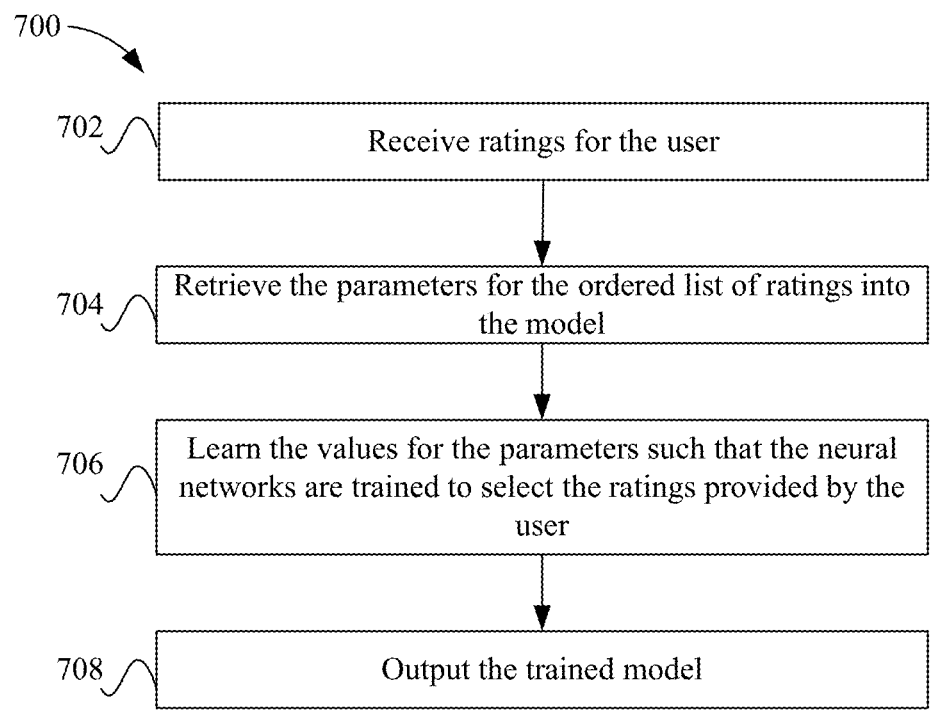
FIG. 7 depicts a simplified flowchart of a method for training the model according to one embodiment.

FIG. 7 depicts a simplified flowchart 700 of a method for training model 202 according to one embodiment. At 702, recommendation engine 108 receives ratings for the user. The ratings may be received from a user over a period of time. For example, model 202 may be auto-regressive and consider a user's past behavior for a certain amount of time. For example, the model predicts the rating of the $i^{th}$ video based on the previous i−1 ratings, which is in an auto-regressive fashion. The auto-regressive model factorizes the joint probability of the ratings of users by chain rule as described above. The ratings may be ordered for the training. For example, the ordering may follow time stamps when the user gave the ratings or the ratings may be randomly ordered. The ordering may be used to model the conditionals of the model 202.

At 704, recommendation engine 108 retrieves the parameters for the ordered list of ratings in model 202. Then, at 706, recommendation engine 108 learns the values for the parameters such that the neural networks are trained to select the ratings provided by the user. The values are optimized as discussed above, such as by minimizing the negative log-likelihood of the probability. At 708, recommendation engine 108 outputs the trained model. The trained model is trained to include parameters that can be used to predict a user's preference. With the parameters, recommendation engine 108 may use the existing models that were used in the training to generate recommendations or instantiate new models for users that were not used in the training to generate recommendations for those users.

Recommendation Generation

Figure 8:
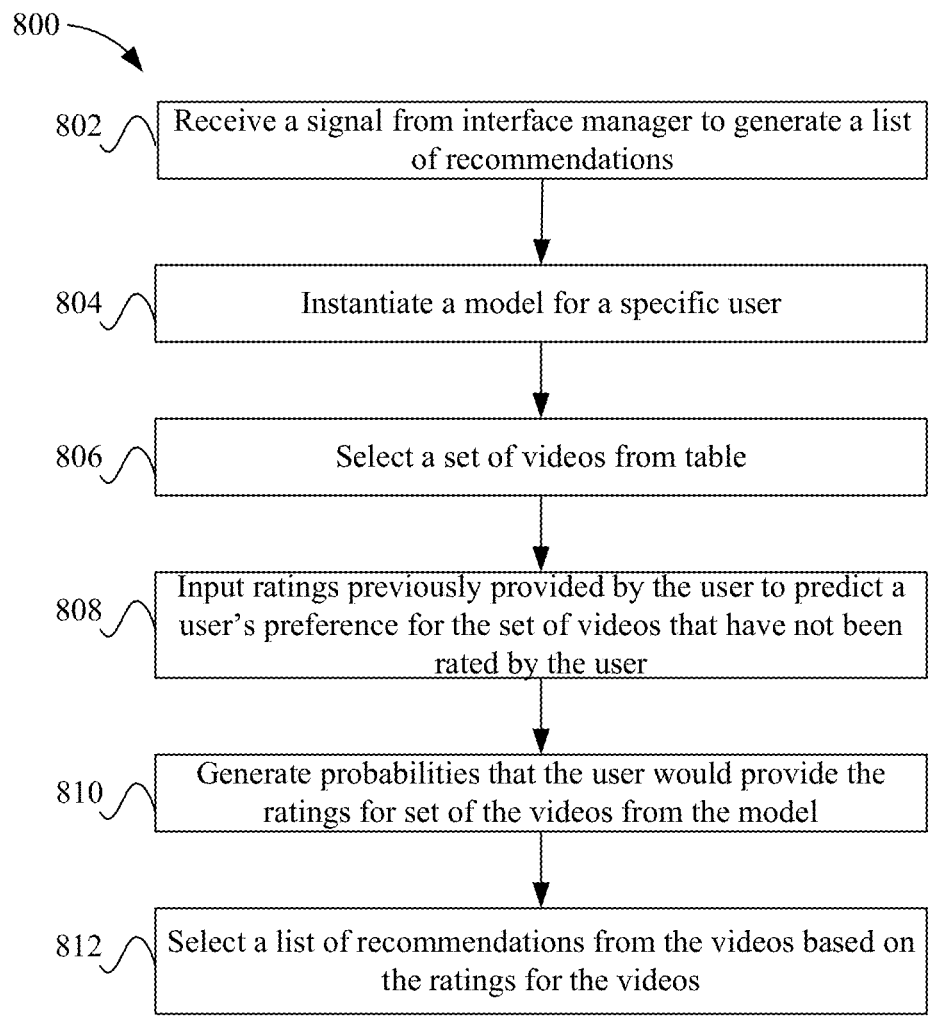
FIG. 8 depicts a simplified flowchart of a method for using the model to generate recommendations according to one embodiment.

Once the model is trained, then recommendation engine 108 uses the model in real-time when a user is using the video delivery service. FIG. 8 depicts a simplified flowchart 800 of a method for using model 202 to generate recommendations according to one embodiment. At 802, recommendation engine 108 receives a signal from interface manager 106 to generate a list of recommendations. The signal may include a context that can be used to generate the recommendations. The context may be a real-time context such as the time of day or a current page the user is viewing. For example, the context may include where the recommendations will be displayed on the page of the interface, such as interface manager 106 may want recommendations for a comedy section or the most relevant recommendations for a time of day.

At 804, recommendation engine 108 instantiates a model 202 for a specific user. For example, if the user was used in the training phase, then a model for that user is already built and selected. However, if the user was not part of the training phase, then a model 202 is built for the user and then selected. The instantiated model uses parameters that were trained for the neural networks during the training phase. Then, at 806, recommendation engine 108 selects a set of videos from table 220. For example, the entire library of videos that the user has not rated may be selected if interface manager 106 wants to display the most relevant videos from the library. When the entire library is discussed, recommendation engine 108 may select unrated videos from table 220 for the user as candidates for recommendation. In another example, depending on the context, recommendation engine 108 may want to only recommend comedies that have not been rated by the user.

At 808, recommendation engine 108 inputs ratings previously provided by the user to predict a user's preference for the set of videos that have not been rated by the user. At 810, recommendation engine 108 generates probabilities that the user would provide the ratings for the set of videos from model 202. For example, for one video, probabilities that a user would provide each rating are generated from the model using the parameters for each rating. A score for the video may then be generated from the probabilities. In one embodiment, the expectation of the ratings is used as the score. The expectation takes the total probability for all the ratings and generates an expectation. For example, the expectation is p1*1+p2*2+p3*3+p4*4+p5*5 for ratings of 1-5, where pi*x is the probability for a rating x. In another embodiment, the rating with the highest probability is the score for the video. The score for the video is then used to rank the video against scores for other videos. In one embodiment, the probabilities for the ratings are generated by sharing parameters as discussed above. For example, the same parameters are used to generate the probabilities for multiple users. Further, when a probability for a rating is generated, the parameters for ratings below that rating are also used. For example, if the probability the user provides the rating of 3 is desired, the parameters for the ratings of 1, 2, and 3 are input into model 202 to generate the probability the user would provide the rating of 3. This process is repeated for all the ratings. This sharing can improve the accuracy of the model. It is noted the sharing may not be used; however, if the sharing is not used in training, then the sharing is not used to predict the probabilities, and vice versa.

At 812, recommendation engine 108 selects a list of recommendations from the videos based on the ratings for the videos. For example, the videos that have the highest scores associated with them are selected, such as the top five videos that that had the highest scores.

Figure 9:
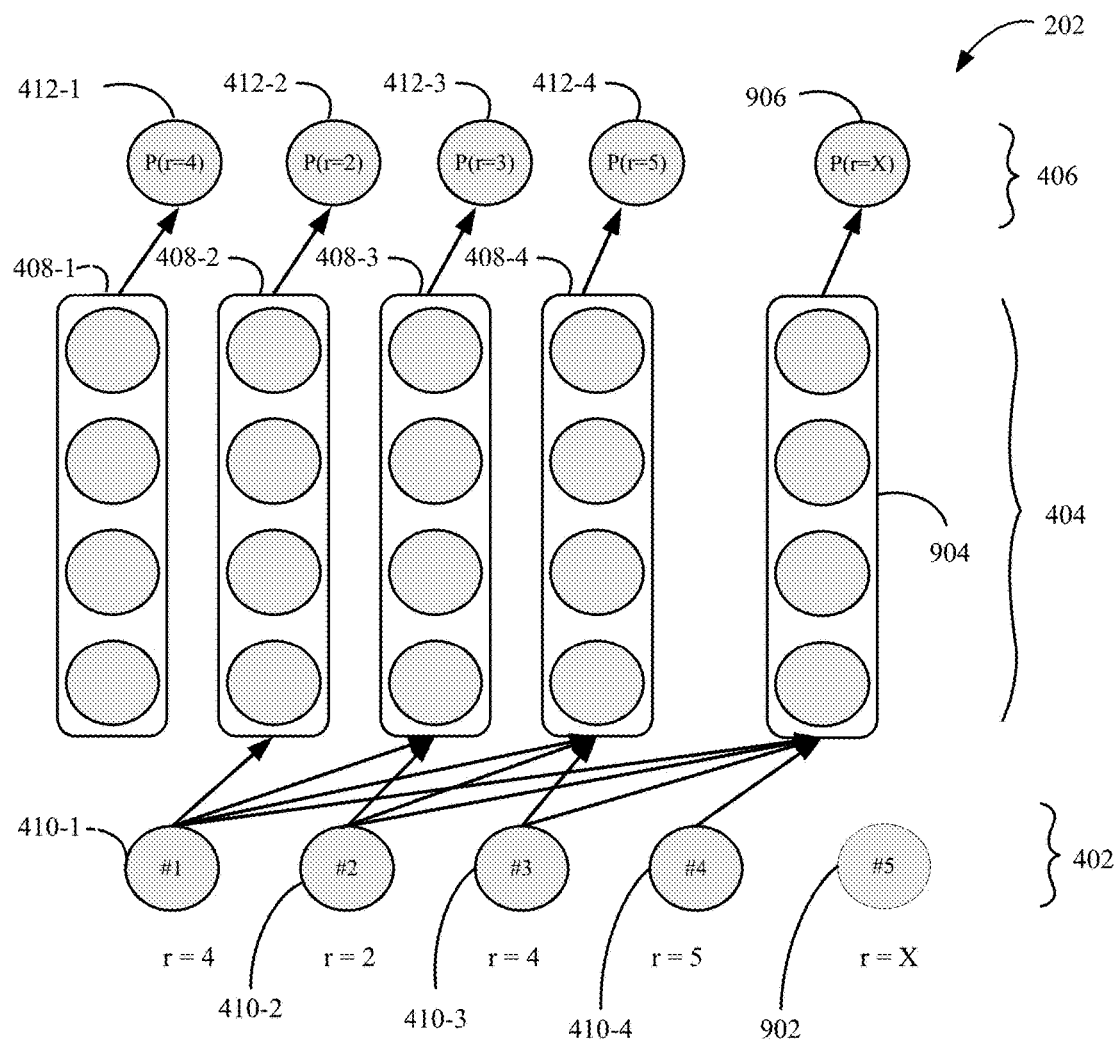
FIG. 9 depicts an example of a model that is used to generate recommendations according to one embodiment.

FIG. 9 depicts an example of a model 202 that is used to generate recommendations according to one embodiment. The model depicted in FIG. 4 is used to demonstrate the generation of recommendations. As discussed above, the ratings the user had provided were [4, 2, 4, 5]. To predict the rating of an unrated movie, recommendation engine 108 predicts the conditional probability for a rating of the unrated movie. In one example, all five ratings may be predicted. The input vector may be [4, 2, 4, 5, X], where X is all possible ratings (e.g., the ratings 1, 2, 3, 4, and 5 is a scale of 1-5) for an unrated video. The rating for the unrated video is shown at 902. A neural network 904 is instantiated for the rating of the unrated video using parameters for the rating. The ratings for videos #1, #2, #3, and #4 are input into neural network 904 based on the ratings provided by the user as discussed above. At 906, the output is the conditional probability for the rating of the unrated video. For example, if the rating of 4 is being tested, the conditional probability is the conditional probability the user would provide a rating for 4 for the unrated video considering the users past ratings. The conditional probabilities for all ratings can be generated and a score the video is generated based on the conditional probabilities. This process continues as other videos are scored.

Deep Model

Figure 10:
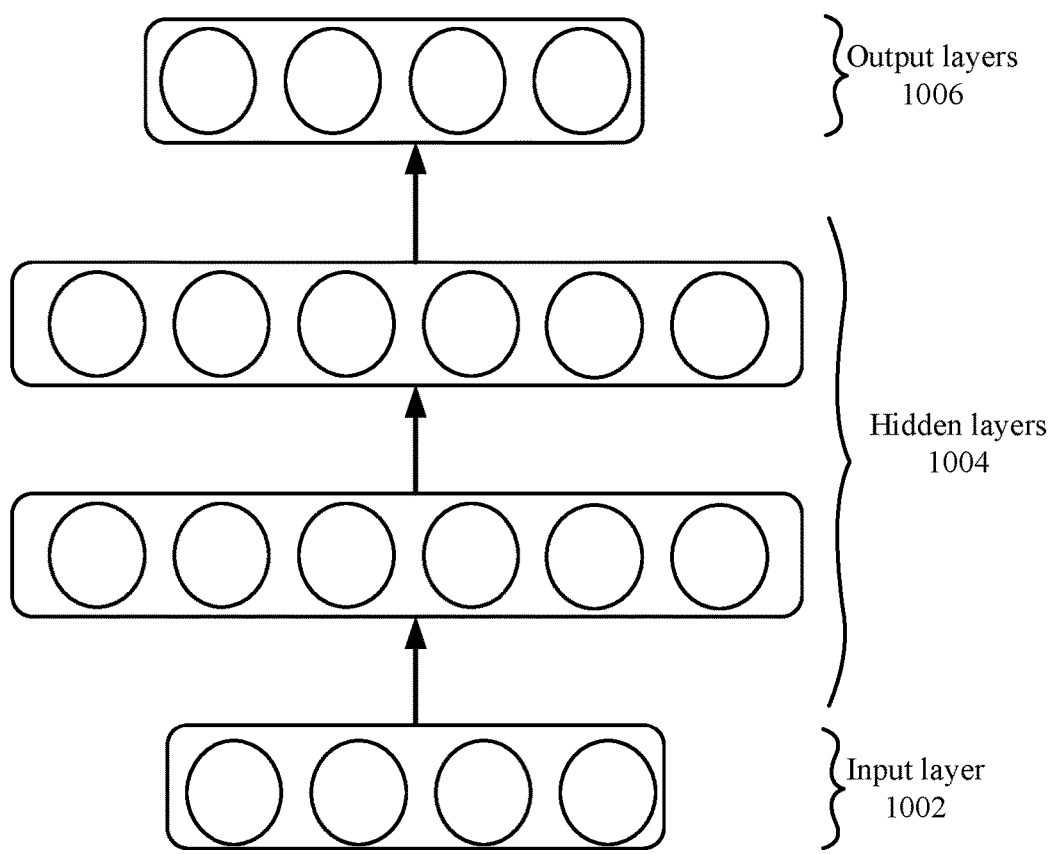
FIG. 10 depicts an example of a deep model according to one embodiment.

The model discussed above may also be extended to include multiple hidden layers. This may be used when examining a large dataset. FIG. 10 depicts an example of a deep model 1000 according to one embodiment. Model 1000 includes an input layer 1002, multiple hidden layers 1004, and an output layer 1006. Instead of sampling a complete ordering over all the rated videos, recommendation engine 108 samples a subset to train the conditional probabilities. Given a user that has rated D items, recommendation engine 108 splits the ratings into parts randomly, such as two parts. One part is used as the input of the model, and the other part is used as the target to make the prediction. Then, recommendation engine 108 computes the conditional probabilities for the ratings being input based on the ratings found in the target part. During training, recommendation engine 108 tries to maximize the probability of the ratings, and the targets are the ratings to be maximized. The multiple hidden layers are used to make the model deeper and increase accuracy.

System

Figure 11:
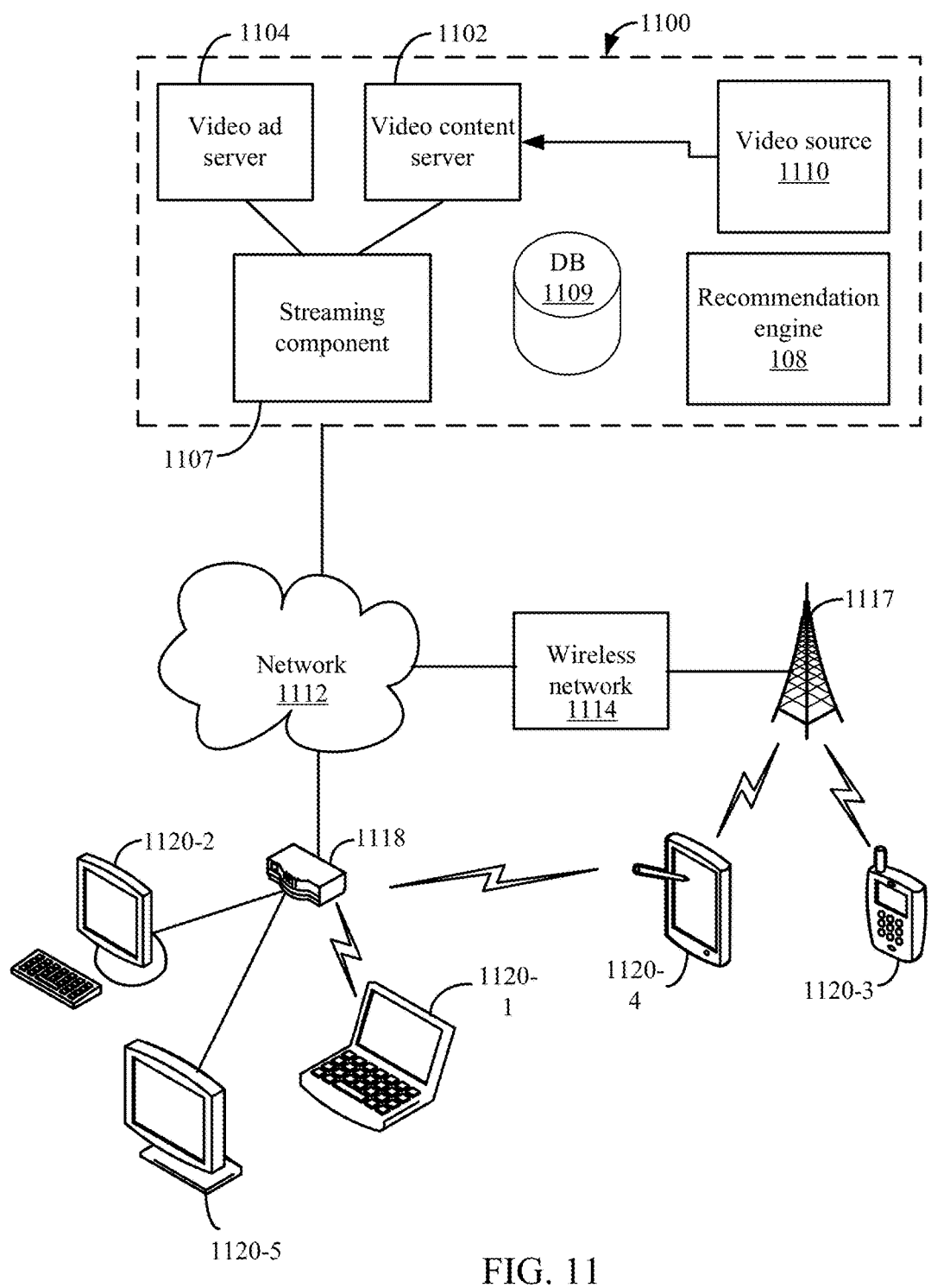
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and/or 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 1100, a public service message, or some other information. The video advertising server 1104 may serve the video advertising segments as directed by a user interface controller (not shown).

The video streaming system 1100 also may include recommendation engine 108.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless cellular telecommunications network (WCS) 1114, or some combination of these or similar networks.

One or more client devices 1120 may be in communication with the video streaming system 1100, via the data communication network 1112 and/or other network 1114. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for a wireless telephony network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HTTP and Real Time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
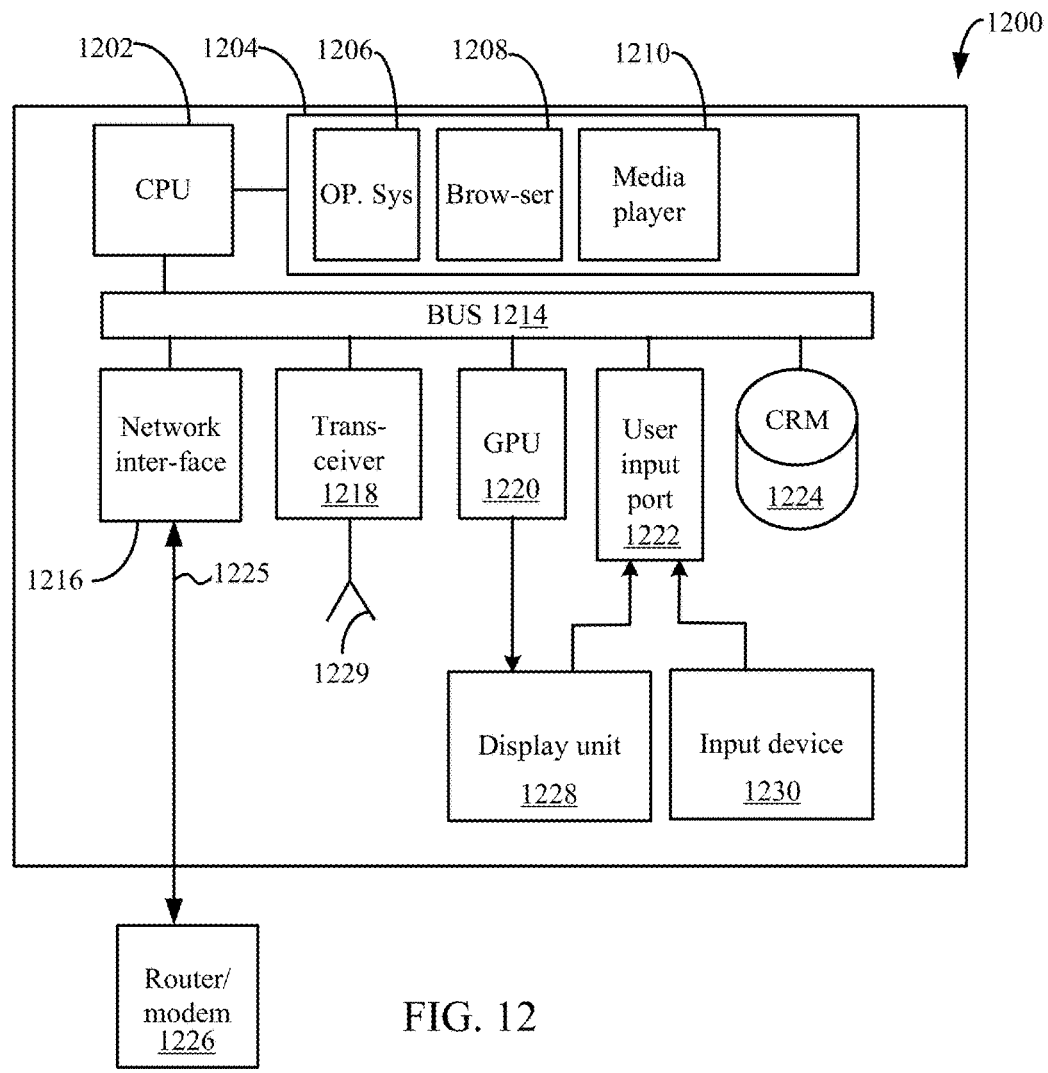
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 1210 for playing video. The memory 1204 may hold additional modules not shown in FIG. 12, for example modules for performing other operations described elsewhere herein.

A bus 1214 or other communication component may support communication of information within the apparatus 1200. The processor 1202 may be a specialized or dedicated microprocessor configured to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium (CRM) in a storage device 1224 may be connected to the bus 1214 and store static information and instructions for the processor 1202; for example, the storage device (CRM) 1224 may store the modules 1206, 1208, and 1210 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured to perform one or more operations of a method as described herein.

A communication interface 1216 may also be connected to the bus 1214. The communication interface 1216 may provide or support two-way data communication between the apparatus 1200 and one or more external devices, e.g., the streaming system 1100, optionally via a router/modem 1226 and a wired or wireless connection. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a plurality of ratings for a plurality of videos from a first user that is using a video delivery service, wherein a rating is restricted to a range of ratings;
instantiating, by the computing device, a first model including a set of connection networks, wherein the set of connection networks include a plurality of inputs that correspond to a number of ratings in the plurality of ratings;
inputting, by the computing device, each rating in the plurality of ratings into an input in the plurality of inputs of the set of connection networks in an order in which the plurality of ratings were received; and
training, by the computing device, the first model to learn values for a set of parameters such that the set of connection networks predict a conditional probability that the first user would provide the rating that was input into the set of connection networks in the order, the conditional probability being conditioned on the first user providing any ratings in the order that are prior to the respective rating that was input, wherein the set of parameters are usable to generate a first list of videos to recommend to the first user using the first model.

2. The method of claim 1, further comprising:
receiving a request to generate the first list of videos to recommend to the first user while the first user is using the video delivery service; and
in response to receiving the request, generating the first list of videos.

3. The method of claim 1, further comprising:
inputting the plurality of ratings into the plurality of inputs in the set of connection networks wherein the set of connection networks includes another input for a rating for a video not rated by the first user; and
determining a conditional probability for the rating for the video not rated by the first user from the another input in the set of connection networks, the conditional probability based on the first user providing any ratings in the order that are prior to the respective rating that was input in the another input.

4. The method of claim 3, wherein the set of connection networks uses one or more of the set of parameters to determine the conditional probability for the rating for the video not rated by the first user.

5. The method of claim 4, wherein a plurality of conditional probabilities are determined for ratings in the range of ratings for the video not rated by the first user that are input into the another input.

6. The method of claim 5, wherein the plurality of conditional probabilities are used to determine whether to include the video not rated by the first user in the first list of videos.

7. The method of claim 6, wherein:
an expectation of the plurality of conditional probabilities is used to determine a score for the video not rated by the first user, and
the score is used to determine whether to include the video not rated by the user in the first list of videos.

8. The method of claim 4, further comprising:
determining conditional probabilities for a plurality of videos not rated by the first user from the set of connection networks; and
using the conditional probabilities to select the first list of videos.

9. The method of claim 1, wherein the set of connection networks comprises a first set of connection networks, and for a second user, performing:
instantiating a second model using a second set of connection networks including a number of inputs corresponding to a number of ratings provided by the second user; and
using at least a portion of the set of parameters to generate a second list of videos to recommend to the second user using the second model, wherein the number of inputs in the second set of connection networks is different from a number of the plurality of inputs in the first set of connection networks when the second user provided a different number of ratings from the first user.

10. The method of claim 1, wherein the order is determined based on time stamps in which the plurality of ratings were received.

11. The method of claim 1, wherein the set of connection networks comprise a deep model that includes a plurality of hidden layers in the set of connection networks.

12. The method of claim 1, wherein an ordinal cost is used to generate the conditional probability, the ordinal cost based on the range of ratings.

13. The method of claim 1, wherein the set of connection networks comprise a plurality of connection networks, wherein a number of the plurality of connection networks corresponds to a number of the plurality of ratings.

14. The method of claim 1, wherein the set of parameters are used in a second model for a second user to generate a second list of videos to recommend to the second user.

15. A non-transitory computer-readable storage medium containing instructions, that when executed, control a computer system to be operable for:
receiving a plurality of ratings for a plurality of videos from a first user that is using a video delivery service, wherein a rating is restricted to a range of ratings;
instantiating a first model including a set of connection networks, wherein the set of connection networks include a plurality of inputs that correspond to a number of ratings in the plurality of ratings;
inputting each rating in the plurality of ratings into an input in the plurality of inputs of the set of connection networks in an order in which the plurality of ratings were received; and
training the first model to learn values for a set of parameters such that the set of connection networks predict a conditional probability that the first user would provide the rating that was input into the set of connection networks in the order, the conditional probability being conditioned on the first user providing any ratings in the order that are prior to the respective rating that was input, wherein the set of parameters are usable to generate a first list of videos to recommend to the first user using the first model.

16. The non-transitory computer-readable storage medium of claim 15, further operable for:
inputting the plurality of ratings into the plurality of inputs in the set of connection networks wherein the set of connection networks includes another input for a rating for a video not rated by the first user; and
determining a conditional probability for the rating for the video not rated by the first user from the another input in the set of connection networks, the conditional probability based on the first user providing any ratings in the order that are prior to the respective rating that was input in the another input.

17. A method comprising:
receiving, by a computing device, a request to generate a list of videos to recommend to a first user of a video delivery service;
instantiating, by the computing device, a model for a set of connection networks that includes a number of inputs that correspond to a number of a plurality of ratings received from the first user, wherein each input corresponds to a rating in the plurality of ratings and wherein a rating is restricted to a range of ratings;
retrieving, by the computing device, a set of parameters for the set of connection networks based on training of the model that was performed using ratings provided by a set of users;
inputting, by the computing device, the plurality of ratings into the inputs of the set of connection networks in an order in which the plurality of ratings were received to generate a conditional probability that the user would provide a rating in the range of ratings for each of a set of videos not rated by the user using the set of parameters, the conditional probability being conditioned on the user providing any ratings in the order that are prior to the respective rating that was input; and
outputting, by the computing device, one or more of the set of videos based on the conditional probability for the rating for the set of videos not rated by the first user.

18. The method of claim 17, wherein a plurality of conditional probabilities for the ratings in the range of ratings for another input in the set of connection networks are determined.

19. The method of claim 18, wherein the plurality of conditional probabilities for the another input are used to determine whether to include the one or more of the set of the videos in the list of videos.

20. The method of claim 19, wherein:
an expectation of the plurality of conditional probabilities is used to determine a score for each video in the set of videos, and
the score is used to determine whether to include each video in the set of videos in the list of videos.

21. The method of claim 17, wherein the set of videos comprises a plurality of videos, and wherein inputting the plurality of ratings comprises:
determining conditional probabilities for ratings in the range of ratings for the plurality of videos not rated by the first user for another input of the set of connection networks; and
using the conditional probabilities to select the one or more of the set of videos from the plurality of videos.

* * * * *